大专利 Office 3,182,094
Patented May 4, 1965

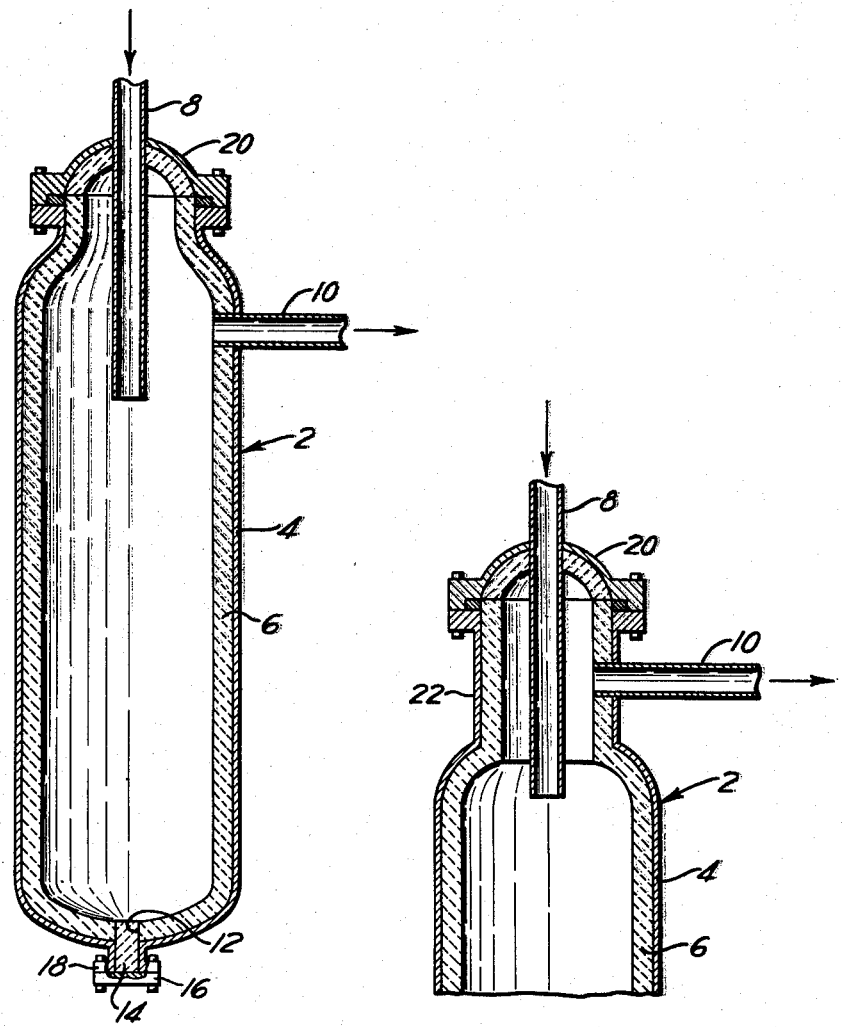

3,182,094
THERMAL HYDRODEALKYLATION PROCESS
Edwin M. Glazier, Fox Chapel, and Ralph W. Helwig and Vernon J. Yeakley, Oakmont, Pa., assignors to Gulf Research & Development Company, Pittsburgh, Pa., a corporation of Delaware
Filed July 13, 1961, Ser. No. 123,727
1 Claim. (Cl. 260—672)

This invention relates to a process and apparatus for the hydrodealkylation of alkyl aromatics, particularly to the thermal hydrodealkylation of alkyl aromatics.

Alkyl aromatics, such as toluene, can be dealkylated to lighter aromatics, such as benzene, by subjecting such alkyl aromatic in the presence of hydrogen to an elevated temperature and elevated pressure for a controlled length of time. As a result of such reaction conditions the alkyl group is cleaved from the alkyl aromatic and combines with the hydrogen present to form a saturated aliphatic hydrocarbon. The desired aromatic can be separated from the saturated aliphatic hydrocarbon and unreacted alkyl aromatic, if present, in any convenient manner.

The hydrodealkylation reaction is highly exothermic. In addition as the temperature of the reaction is increased the amount of time required for a given amount of reaction is greatly decreased, or for the same residence time conversion and yield of alkyl aromatic to desired product is greatly increased. It would be extremely desirable, therefore, to employ some of the heat of reaction to obtain extremely high temperature levels in the reaction zone. This desirable condition has been difficult to achieve in the past, however, since common, inexpensive metals which could be used in the design of the desired reactor would be unlikely to withstand the pressures imposed on the same under the high temperature conditions employed. Moreover, with hydrogen present severe danger to metals due to hydrogen embrittlement and blistering at high temperatures would also be likely to occur.

We have found that the above difficulties can be avoided and the hydrodealkylation of alkyl aromatics can be effected at extremely high temperatures, using the heat of reaction as an aid in arriving at the high reaction temperature, without unduly weakening the metal walls of the reactor by following the procedures outlined herein.

The advantages of the present invention can be understood by reference to the accompanying drawing which forms a part of this specification. FIGURE 1 is a cross-sectional view of a reactor which can be employed in the practice of the present invention, while FIGURE 2 is a cross-sectional view of a modification thereof.

Referring to FIGURE 1 there is illustrated an elongated reactor vessel 2 provided with an outer metal shell 4 and an inner refractory liner 6. Reactor vessel 2 is provided at one end thereof with an inlet line 8 which extends into the reactor for introducing reactants therein. An outlet line 10 is provided at the same end of the reactor vessel 2 at a level intermediate the end of said reactor vessel and the free end of said inlet line. In the event it is desired to remove solid or particulate material which may form or be deposited within reactor vessel 2, there is provided at the end thereof remote from inlet line 8 an opening 12, preferably circular in cross-section, wherein there fits a refractory plug 14, preferably of the same composition as refractory liner 6, which can be held in place by blind flange 16 bolted or otherwise attached to flange 18 which forms a part of the metal shell 4. Access into reactor 2 can be had by providing the same with a removable cap 20 which can be bolted or otherwise securedly attached thereto. Desirably the end of reactor 2 adjacent the inlet line 8 can be further provided with a neck portion 22 as shown in FIGURE 2.

The reactor herein described is suitable for use in the thermal hydrodealkylation of alkyl aromatics such as toluene, xylenes, trimethyl benzene isomers, alkyl napthalenes and mixtures thereof. The initial step in starting the reaction can involve, for example, heating the alkyl aromatic and hydrogen to hydrodealkylation temperature. In general preheat temperature can range from about 1000° to about 1100° F. Sufficient hydrogen must be present to replace the alkyl chain cleaved from the aromatic ring at the elevated reaction temperatures and also to combine with the alkyl chain to form therewith a saturated aliphatic hydrocarbon. In general the molar ratio of hydrogen to alkyl aromatic charge can be from one to about 10.

The heated reaction mixture is introduced into the reactor vessel 2 by line 8. The desired dealkylation reaction becomes autogeneous at the temperature of about 1000° to about 1100° F. The dealkylation reaction is highly exothermic. At the high temperatures involved herein the allowable metal stress is comparatively low and it would be extremely expensive to use a suitable metal which would withstand the pressures employed, which can be above 100 pounds per square inch gauge, preferably about 100 to about 1000 pounds per square inch gauge. In addition common, inexpensive metals in the presence of hydrogen at the temperatures and pressures employed suffer considerably from hydrogen embrittlement and blistering. For such reason a refractory lining 6 is employed as an insulating medium in order to maintain the temperature of metal wall 4 at a level of about 500° to about 1000° F.

As the reaction mixture proceeds generally in reactor 2 toward its remote end and the dealkylation reaction progresses and the heat resulting from the reaction is in large measure retained in the reaction zone by refractory lining 6, the temperature of the reaction mixture continues to rise. The reaction mixture as it continues in its path and approaches the base of the reactor turns and rises within the reactor adjacent the walls thereof and then finds its way out of the reactor by means of line 10. Eddy currents will form and tend to mix the incoming feed and outgoing streams.

When the hydrodealkylation reaction has been initiated as described above it becomes self-sustaining. Once this state has been achieved, the mixture of reactants is introduced into the reactor at a selected temperature level below the start-up temperature to control the temperature level within the reactor. The reactor feed rate is adjusted to increase mixing and approach an equilibrium state of uniform composition and temperature throughout the reactor.

In order to approach a uniform temperature within reactor 2 and to avoid the formation of any appreciable zones of stagnation, it is critical in the practice of this invention that efficient mixing of material within reactor 2 be obtained at all times. This is effected by suitable introduction of feed and removal of product from the reaction zone. The inlet line 8 must extend an appreciable distance within reactor 2, preferably at least about $\frac{1}{10}$ but no more than about $\frac{1}{4}$ of the free longitudinal distance of reactor 2. Exit line 10 must be located adjacent the same end of the reactor as inlet line 8 but at a level intermediate the free end of inlet line 8 and the adjacent end of the reactor.

Why this is so is apparent from the following. If the end of inlet line 8 were to terminate at a level intermediate exit line 10 and the adjacent end of the reactor, a significant portion of the reaction mixture could be short circuited to the exit line. Only a portion of the reaction mixture would undergo reaction, less mixing would occur and more of the reactor would remain unused.

Stabilized high alloy austenitic steels such as the following:

| Nominal Composition | ASME Serial Designation | Grade |
| --- | --- | --- |
| 16Cr–13Ni–3Mo | SA-213 | TP-316 |
| 16Cr–13Ni–3Mo | SA-312 | TP-316 |
| 16Cr–13Ni–3Mo | SA-376 | TP-316 |
| 18Cr–13Ni–4Mo | SA-312 | TP-317 |
| 18Cr–10Ni–Ti | SA-213 | TP-321 |
| 18Cr–10Ni–Cb | SA-213 | TP-307 |
| 18Cr–10Ni–Cb | SA-213 | TP-348 |
| 18Cr–10Ni–Ti | SA-312 | TP-321 |
| 18Cr–10Ni–Cb | SA-312 | TP-347 |
| 18Cr–10Ni–Cb | SA-312 | TP-248 |
| 18Cr–10Ni–Ti | SA-376 | TP-321 |
| 18Cr–10Ni–Cb | SA-376 | TP-347 |
| 18Cr–10Ni–Cb | SA-376 | TP-348 | can be employed in the construction of inlet line 8. Outlet line 10, being at even higher temperatures than inlet line 8, can also be made of the above-defined stabilized high alloy austenitic steels. Either line 8 or 10 can be made of a low alloy steel if it is refractory lined.

In cases wherein the metal wall 4 is maintained at a temperature level not exceeding 700° F., it is preferred that carbon steels such as the following:

| Nominal Composition | ASME Serial Designation | Grade |
| --- | --- | --- |
| C–Si | SA-201 | A |
| C–Si | SA-201 | B |
| C–Si | SA-212 | A |
| C–Si | SA-212 | B |
| C–Mn–Si | SA-299 | | or low alloy steels such as the following:

| Nominal Composition | ASME Serial Designation | Grade |
| --- | --- | --- |
| C–½Mo | SA-204 | A |
| C–½Mo | SA-204 | B |
| C–½Mo | SA-204 | C |
| Mn–½Mo | SA-302 | A |
| Mn–½Mo | SA-302 | B |
| 5Cr–½Mo | SA-357 | |
| ½Cr–½Mo | SA-387 | A |
| 1Cr–½Mo | SA-387 | B |
| 1¼Cr–½Mo–Si | SA-387 | C |
| 2¼Cr–1Mo | SA-387 | D |
| 3Cr–1Mo | SA-387 | E | be employed having a wall thickness of about ½ to about four inches. In the event a temperature in excess of 700° F. but below 1000° F. can be tolerated in the metal wall 4, the same can be composed of the above stabilized high alloy austenitic steels. If desired, in order to combine the temperature, hydrogen and corrosion resistivity of the high-alloy steels with the economy of the low alloy or carbon steels, the metal wall can be made in two or more layers in intimate contact with each other, the outer wall or layer being composed of an inexpensive metal such as the above carbon or low alloy steels and the inner wall of an alloy steel such as the above stabilized high alloy austenitic steels. In order to maintain the above temperature levels on the outer metal wall, a refractory lining composed largely of the oxides of silica, aluminum, magnesium, titanium, chromium, etc., similar to the refractories manufactured by Harbison-Walker, Pittsburgh, Pa., designated as "Insulating Fire Brick," "Fireclay," "Silica," "Alusite," "Fosterite," "Chrome," "Korundal," "Magnesite," etc. having a thickness of about one to about 12 inches can be employed. The refractory lining can be made of form-fitting refractory bricks made to fit the contours of the metal wall 4, with or without a similar mortar, or it can be sprayed, trowled or centrifugally cast onto the wall.

Under the conditions defined hereinabove, the residence time of the reactants within the reactor is about one to about 500 seconds. As the reaction product is removed from the reaction zone by line 10 it is at the same temperature level existing in the reaction zone, namely at a temperature of about 1300° to about 1700° F., and comprises principally dealkylated alkyl aromatic, unreacted charge aromatic, methane and excess hydrogen. In a matter of about one to about five seconds the reaction mixture is cooled by any convenient means, for example, by indirect heat exchange relationship with water, to a temperature below about 600° F. and after further cooling through heat exchangers to ambient temperature. Hydrogen and other gases are then vented from the reaction mixture and the remainder is separated into its component parts by any suitable means, preferably by distillation at a temperature of about 175° to about 250° F. and a pressure of about one to about 10 pounds per square inch gauge.

The advantage of employing a reactor having a neck portion 22 as illustrated in FIGURE 2 resides in the fact that the amount of stagnant area in the reactor between the end of feed line 8 and the adjacent end of the reactor is minimized.

The invention can better be described by reference to Example I below.

*Example I*

The reactor in this example is one similar to that illustrated in FIGURE 2 of the drawing having a total length, exclusive of the neck portion and head, of 26.6 feet and a total volume, also exclusive of the neck portion and head, of 317.8 cubic feet. The inner diameter of the metal wall is 4.5 feet and the inner diameter of the refractory liner four feet. The metal wall, having a total thickness of two inches, is made of two layers, a back-up plate 1.6 inches thick of SA–204–B low alloy steel and a steel liner 0.4 inch thick of 316 stainless steel. The refractory liner is three inches thick and is made of Harbison-Walker "Firebrick," which is composed of about 50 percent by weight $SiO_2$, about 45 percent by weight $Al_2O_3$, about 2.5 percent by weight $TiO_2$ and about 2.5 percent by weight of other material. A rock wool blanket one inch thick surrounds the back-up plate, and an aluminum jacket of 26 gauge protects the same from damage. The neck section is two feet long, the inner diameter of the metal wall thereof being 2.5 feet and the inner diameter of the refractory lining of said wall being two feet. The feed line extends five feet in the reactor and is composed of 316 stainless steel.

The feed, which is introduced into the reactor at 845° F. and at the rate of 17,059.1 pounds per hour, is composed of about 5.37 percent by weight of hydrogen and about 81.84 percent by weight of toluene. The pressure in the reactor is maintained at 900 pounds per square inch gauge. Below the entry line the reaction mixture is substantially homogeneous, and the temperature therein is 1229° F. and conversion of toluene to benzene is 65 percent. As this mixture rises above the end of the inlet line on its way to the exit line, it has reached a temperature of 1253° F. and a conversion of 70 percent 21.77 feet above the reactor floor. At a level 22.91 feet above the reactor floor the temperature of the reaction mixture is 1277° F. and the conversion 75 percent. At levels 23.91 and 24.87 feet above the reactor floor the temperatures are respectively, 1302° F. and 1326° F., and the conversions 80 and 85 percent. As the reaction mixture leaves the reactor the conversion has risen to 90 percent and the temperature to 1350° F. The average residence time has been about 85 seconds. The reactor effluent comprises per hour 1395.94 pounds of toluene, 9,727.53 pounds of benzene, 364.81 pounds of hydrogen, 5400.41 pounds of methane and other gases, and 170.39 pounds of diphenyl and other higher aromatics. The reactor effluent is then cooled to a temperature of 600° F. in a matter of five seconds, and after venting the methane, hydrogen and other gases therefrom is subjected to distillation at a temperature of 180° F. and a pressure of one pound per square inch gauge at the top of the fractionator to recover the benzene.

Obviously many modifications and variations of the invention, as hereinabove set forth can be made without departing from the spirit and scope thereof, and therefore only such limitations should be imposed as are indicated in the appended claim.

We claim:

A process for the thermal hydrodealkylation of an alkyl aromatic which comprises introducing a mixture of an alkyl aromatic and hydrogen having a temperature of about 1000° to 1100° F. through one end of an elongated reaction zone and discharging the same into said reaction zone at a point intermediate the ends thereof a distance from said one end of about $\frac{1}{10}$ to about $\frac{1}{4}$ of the free longitudinal distance of said reaction zone, continuing movement of said mixture longitudinally in said reaction zone down through the center thereof to form a path of movement toward the second end of said reaction zone, reversing the path of movement of said mixture, thereby forming eddy currents therein and obtaining mixing of said mixture in said reaction zone, concomitantly hydrodealkylating said alkyl aromatic and obtaining temperature of said reaction zone of about 1300° to about 1700° F., the reaction heat produced by said hydrodealkylation being maintained within said reaction zone to the extent required to obtain said latter temperature level, and thereafter recovering dealkylated alkyl aromatic from the reaction product obtained at a level intermediate the point of introduction of said reaction mixture into said reaction zone and said one end of said reaction zone.

References Cited by the Examiner
UNITED STATES PATENTS

| | | | |
|---|---|---|---|
| 1,222,402 | 4/17 | Hirt | 208—107 |
| 1,935,067 | 11/33 | Vobach et al. | 196—133 |
| 2,066,697 | 1/37 | Delattre-Seguy | 208—112 |
| 2,206,729 | 7/40 | Pier et al. | 208—112 |
| 2,629,684 | 2/53 | Leffer | 260—672 |
| 2,763,532 | 9/56 | McKinnis | 23—284 |
| 2,768,219 | 10/56 | Hoffmann et al. | 260—672 |
| 2,907,800 | 10/59 | Mertes | 260—272 |
| 2,945,072 | 7/60 | Joris | 260—672 |

ALPHONSO D. SULLIVAN, *Primary Examiner.*